(12) United States Patent
Iyengar et al.

(10) Patent No.: US 9,424,041 B2
(45) Date of Patent: Aug. 23, 2016

(54) EFFICIENT WAY TO CANCEL SPECULATIVE 'SOURCE READY' IN SCHEDULER FOR DIRECT AND NESTED DEPENDENT INSTRUCTIONS

(71) Applicant: SAMSUNG ELECTRONICS CO., LTD., Suwon-si (KR)

(72) Inventors: Ravi Iyengar, Austin, TX (US); Bradley Gene Burgess, Austin, TX (US); Sandeep Kumar Dubey, Austin, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 592 days.

(21) Appl. No.: 13/836,392

(22) Filed: Mar. 15, 2013

(65) Prior Publication Data

US 2014/0281431 A1    Sep. 18, 2014

(51) Int. Cl.
*G06F 9/30* (2006.01)
*G06F 9/38* (2006.01)

(52) U.S. Cl.
CPC .......... *G06F 9/30181* (2013.01); *G06F 9/3838* (2013.01); *G06F 9/3842* (2013.01); *G06F 9/3836* (2013.01)

(58) Field of Classification Search
CPC . G06F 9/30181; G06F 9/3836; G06F 9/3851; G06F 9/3838
See application file for complete search history.

(56) References Cited

U.S. PATENT DOCUMENTS

| | | | |
|---|---|---|---|
| 5,778,210 A | 7/1998 | Henstrom et al. | |
| 6,065,105 A | 5/2000 | Zaidi et al. | |
| 6,792,524 B1 * | 9/2004 | Peterson | G06F 9/3842 712/234 |
| 6,988,185 B2 | 1/2006 | Stark, IV et al. | |
| 7,130,990 B2 | 10/2006 | Brekelbaum et al. | |
| 7,600,103 B2 | 10/2009 | Sodani et al. | |
| 8,239,661 B2 | 8/2012 | Abernathy et al. | |
| 2007/0043932 A1 | 2/2007 | Kulkarni et al. | |
| 2007/0204135 A1 * | 8/2007 | Jiang | G06F 9/3824 712/214 |
| 2010/0332806 A1 | 12/2010 | Golla et al. | |
| 2011/0078697 A1 * | 3/2011 | Smittle | G06F 9/3836 718/104 |
| 2014/0223144 A1 * | 8/2014 | Heil | G06F 9/30043 712/214 |

OTHER PUBLICATIONS

Antonio Gonzalez &Fernando Latorre, Processor Microarchitecture, Mar. 3, 2010,Morgan & Claypool Publishers, pp. 67-68.*

* cited by examiner

*Primary Examiner* — Idriss N Alrobaye
*Assistant Examiner* — Courtney Carmichael-Moody
(74) *Attorney, Agent, or Firm* — Sughrue Mion, PLLC (57) ABSTRACT

A method and apparatus for simultaneously canceling a dependent instruction and a nested dependent instruction when a cancel timer of a source of the dependent instruction and a cancel timer of a source of the nested dependent instruction expire and a producer instruction speculatively waking up the dependent instruction is canceled.

19 Claims, 5 Drawing Sheets

EFFICIENT WAY TO CANCEL SPECULATIVE 'SOURCE READY' IN SCHEDULER FOR DIRECT AND NESTED DEPENDENT INSTRUCTIONS

BACKGROUND

1. Field

Apparatuses and methods consistent with exemplary embodiments relate to canceling instructions and resetting a source-ready state, and more particularly to, canceling direct dependent instructions and nested dependent instructions of a producer instruction using a cancel timer and resetting source ready bits.

2. Description of the Related Art

Modern microprocessors adopt a technique of speculative scheduling of instructions. When a producer instruction in a scheduler of a microprocessor is canceled due to an event such as load misses, faults, data hazards, etc., a state of "source ready" for dependent instructions which have been speculatively woken up by the producer instruction needs to be reset in a scheduler for the instructions so that these dependent instructions can be eligible to be picked again. The dependent instructions may be direct or indirect (or nested) instructions.

In a related art approach to undo or reset the state of "source ready" for dependent instructions in a scheduler when a producer instruction is canceled, destination tags of the canceled producer instruction are compared with source tags of all the instructions in the scheduler. If there is a match between a destination tag of the canceled producer instruction and a source tag of any instruction in the scheduler, the scheduler resets the source-ready state of the dependent instruction in the scheduler.

Since, however, the above comparison needs to be done for all the sources of all the instructions in the scheduler, the number of comparison is enormous to consume time, power, and resources of the microprocessor.

SUMMARY

In order to address problems of the related art in canceling dependent instructions when a producer instruction is canceled and resetting the source-ready state thereafter, one or more exemplary embodiments of the inventive concept provide a simple, power-saving and time-efficient method for canceling direct dependent instructions and indirect or nested dependent instructions simultaneously and resetting the source-ready state for the dependent instructions by using a single cancel indication from a main producer instruction of the dependent instructions.

However, the inventive concept is not restricted to the exemplary embodiments set forth herein. Various aspects of the inventive concept will become apparent to one of ordinary skill in the art to which the exemplary embodiments pertain by referencing the detailed description given below.

According to an aspect of an exemplary embodiment, there is provided a method of processing a plurality of instructions. The method may include: speculatively waking up a source of a dependent instruction by a producer instruction of the dependent instruction; speculatively waking up, by the dependent instruction, a source of a nested dependent instruction depending on the dependent instruction; setting a source ready bit of the source of the dependent instruction and setting a source ready bit of the source of the nested dependent instruction to indicate that the source of the dependent instruction and the source of the nested dependent instruction are ready for access; setting a cancel timer of the source of the dependent instruction and setting a cancel timer of the source of the nested dependent instruction based on a cancel time at which a cancel is expected to be asserted for the producer instruction; and simultaneously canceling the dependent instruction and the nested dependent instruction if (i) the cancel timer of the source of the dependent instruction and the cancel timer of the source of the nested dependent instruction expire and (ii) the producer instruction is canceled.

The cancel timer of the source of the dependent instruction and the cancel timer of the source of the nested dependent instruction may expire when the cancel timer of the source of the dependent instruction and the cancel timer of the source of the nested dependent instruction reach a predetermined value.

The predetermined value may be a non-zero value.

The resetting the source ready bit of the source of the dependent instruction and the source ready bit of the source of the nested dependent instruction may indicate that the dependent instruction and the nested dependent instruction are not available to be picked unless the dependent instruction and the nested dependent instruction are woken up again. Here, the source ready bits may be reset after the dependent instruction and the nested dependent instruction are simultaneously canceled.

The cancel timer of the source of the dependent instruction and the cancel timer of the source of the nested dependent instruction may also be reset if (i) the cancel timer of the source of the dependent instruction and the cancel timer of the source of the nested dependent instruction expire and (ii) the producer instruction is canceled.

The nested dependent instruction may be an instruction woken up by the dependent instruction a predetermined time after the dependent instruction is speculatively woken up by the producer instruction, in which case the cancel timer of the source of the dependent instruction and the cancel timer of the source of the nested dependent instruction are set to different values based on the cancel time.

The producer instruction may be an instruction which is speculatively picked.

The cancel time at which the cancel is expected to be asserted for the producer instruction may be based on a number of clock cycles expected for the cancel to be asserted for the producer instruction from a time of speculatively waking up the source of the dependent by the producer instruction.

According to an aspect of another exemplary embodiment, there is provided an apparatus for instruction processing. The apparatus may include: a scheduler which picks a producer instruction for scheduling execution; and a controller which is configured to: speculatively wake up a source of a dependent instruction by a producer instruction of the dependent instruction; speculatively wake up, by the dependent instruction, a source of a nested dependent instruction depending on the dependent instruction; set a source ready bit of the source of the dependent instruction and setting a source ready bit of the source of the nested dependent instruction to indicate that the source of the dependent instruction and the source of the nested dependent instruction are ready for access; set a cancel timer of the source of the dependent instruction and setting a cancel timer of the source of the nested dependent instruction based on a cancel time at which a cancel is expected to be asserted for the producer instruction; and simultaneously cancel the dependent instruction and the nested dependent instruction if (i) the cancel timer of the source of the dependent instruction and the cancel timer of the source of the nested dependent instruction expire and (ii) the producer instruction is canceled.

The controller may be further configured to reset the source ready bit of the source of the dependent instruction and the source ready bit of the source of the nested dependent instruction to indicate that the dependent instruction and the nested dependent instruction are not ready to be picked unless the dependent instruction and the nested dependent instruction are woken up again.

The source ready bit of the source of the dependent instruction, the source ready bit of the source of the nested dependent instruction, the cancel timer of the source of the dependent instruction, and the cancel timer of the source of the nested dependent instruction may be set as entries of the scheduler.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF THE EXEMPLARY EMBODIMENTS

Advantages and features of the inventive concept and methods of accomplishing the same may be understood more readily by reference to the following detailed description of exemplary embodiments and the accompanying drawings. The inventive concept may, however, be embodied in many different forms and should not be construed as being limited to the embodiments set forth herein. Rather, these embodiments are provided so that this disclosure will be thorough and complete and will fully convey the inventive concept to those skilled in the art, and the inventive concept will only be defined by the appended claims. In the drawings, the thickness of layers and regions are exaggerated for clarity.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the inventive concept and is not a limitation on the scope of the inventive concept unless otherwise specified. Further, unless defined otherwise, all terms defined in generally used dictionaries may not be overly interpreted.

Figure 1:
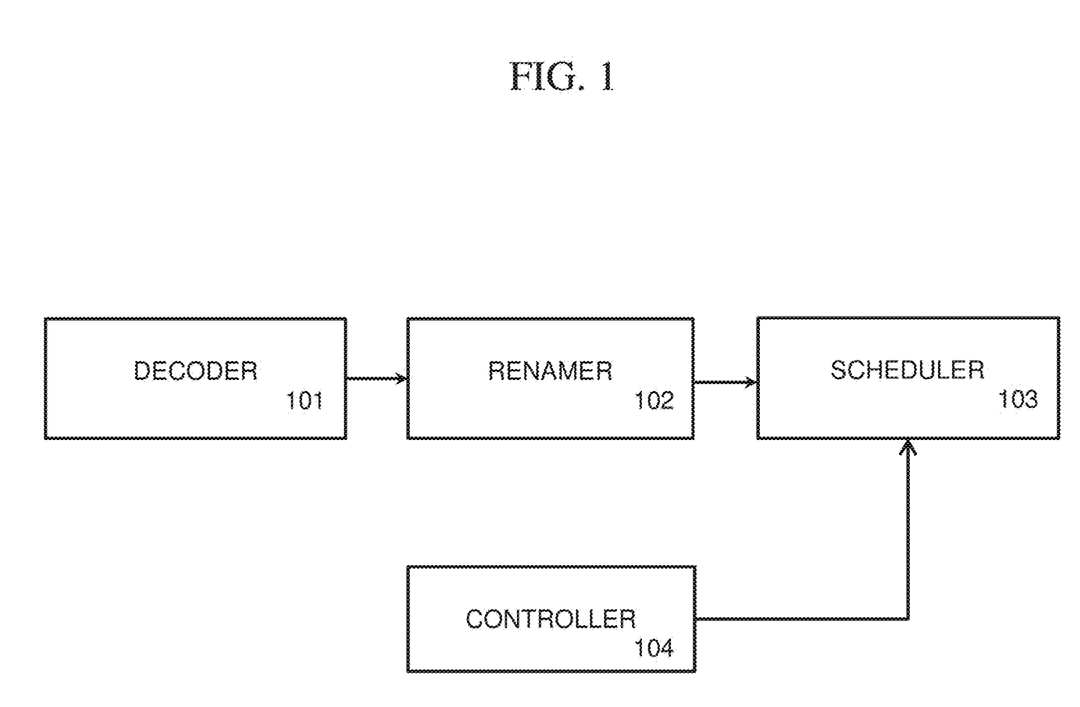
FIG. 1 illustrates portion of processor architecture according to an exemplary embodiment.

FIG. 1 illustrates a portion of processor architecture according to an exemplary embodiment. The architecture includes a decoder 101, a renamer 102, a scheduler 103 and a controller 104. The architecture illustrated in FIG. 1 may apply to various types of a processor including a multiple-core processor, according to exemplary embodiments. Well-known structures such as fetcher, cache, execution unit are not shown in the drawings so as not to obscure the description of exemplary embodiments.

In the processor of FIG. 1, instructions from a memory (not shown) are fetched to the decoder 101 by a fetcher (not shown). The decoder 101 decodes the instructions into lower level, detailed micro-operations (micro-ops). Thus, a stream of instructions is mapped into a stream of micro-ops. The decoded micro-ops are sent to the renamer 102, where the sources and/or the destinations are renamed, and then, sent to the scheduler 103 to schedule execution. A micro-op typically has two or three source operands and one or two destination operands. The source operands are used to specify registers which contain source data, and destination operands are used to specify registers to which results of an operation of the micro-op are written. The renamer 102 renames the source registers and/or destination registers in the micro-op. Register renaming is a technique for elimination of data hazards, such as write-after-read and write-after-write hazards in an out-of-order execution of micro-ops. The scheduler 103 picks up micro-ops and schedules execution of the micro-ops in an order that may or may not follow an original order of a micro-op sequence. The controller 104 is configured to control overall operations of the scheduler 103. Although the controller 104 is shown as one separate component, it may be constituted as an element of the scheduler 103.

Figure 2:
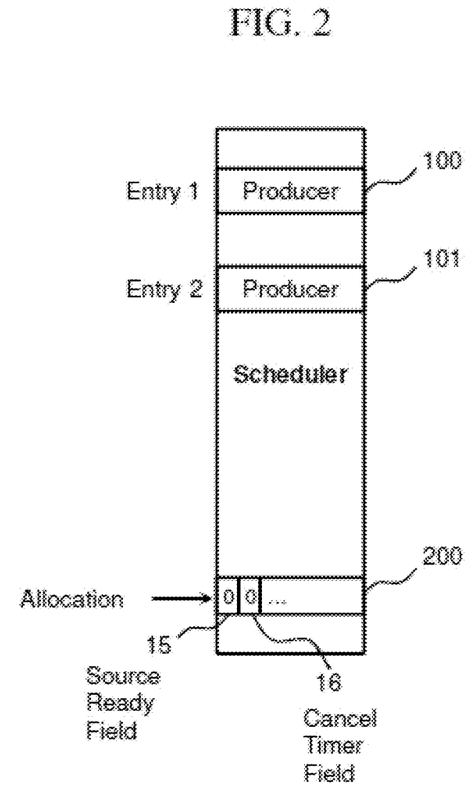
FIG. 2 illustrates entries of a scheduler in which a producer instruction and a dependent instruction are allocated, according to an exemplary embodiment.

FIG. 2 illustrates entries of instructions located in a scheduler of a processor for scheduling execution according to an exemplary embodiment. Here, the scheduler may be the scheduler 103 described above in reference to FIG. 1.

As shown in FIG. 2, a producer instruction 100, a producer instruction 101, and a dependent instruction 200 depending on the producer instructions 100, 101 are located in the scheduler 103, according to an exemplary embodiment. Although FIG. 2 illustrates only producer instructions 100 and 101, the dependent instruction 200 may be dependent upon other producer instructions, based upon a number of sources of the dependent instruction 200, as different sources of the dependent instruction 200 may be dependent upon different producer instructions. When the dependent instruction 200 is located in the scheduler 103, the scheduler 103 allocates a source ready field 15 and a cancel timer field 16 per source of the dependent instruction 200, according to an exemplary embodiment. The source ready field 15 is configured to contain a source ready bit, and the cancel timer filed is configured to contain a cancel timer or a cancel timer value. In this embodiment, the source ready bit and the cancel timer are not set and remain at "0" at the time of allocation of these two fields for the dependent instruction. However, this source ready bit will be set as ready, i.e., set to "1", and the cancel timer will be set to a predetermined value by the controller 104 when the producer instruction speculatively wakes up the dependent instruction as explained below.

When the dependent instruction 200 is speculatively woken up by the producer instructions 100 and 101 (and possibly additional producer instructions based on the number of sources of the dependent instruction 200, as discussed above) and source dependency is met for each source of the dependent instruction 200, the controller 104 sets the source ready bit in the source ready field 15 for each source of the dependent instruction in the scheduler 103. For example, when the producer instructions 100 and 101 wake up the dependent instruction 200 speculatively and the source dependency is met for each source of the dependent instruction 200, which may be met at different points in time, the controller 104 sets the source ready bit for each source to a value "1" to indicate that source data of each source will be available in a number of cycles; otherwise, the value of the source ready bit for each source remains at the value "0". When the source ready bit is set to the value "1" for all sources of the dependent, then the dependent instruction 100 is considered ready to be picked from the scheduler 103 for execution.

In addition to setting the source ready bit, when the producer instructions 100 and 101 wake up the dependent instruction 200 and source dependency is met for each source of the dependent instruction 200, speculatively, the controller 104 sets the cancel timer in the cancel timer filed 16 for each source of the dependent instruction 200 to a predetermined time value. The cancel timer is used by the controller 104 to control cancel timing of the dependent instruction 200, and resetting the source ready bit for each source of the canceled dependent instruction 200. When the predetermined time value set to the cancel timer has passed and the producer instruction 100 is canceled from scheduling, the dependent instruction 200 is also canceled and the source ready bit and the cancel timer for each source of the dependent instruction 200 are reset so the dependent instruction 200 is available to be picked again later. Here, the predetermined time of the cancel timer may be a number of cycles it will take for a possible cancel to be asserted for the producer instruction 100 according to an exemplary embodiment.

The cancel timer set to the predetermined time value for each source of the dependent instruction 200 dependent on producer instructions 100 and 101 starts ticking down as soon as the source ready bit is set for a source of the dependent instruction. If the producer instruction is canceled right when the cancel timer expires, then the dependent instruction is canceled and the source ready bit and the cancel timer for each source of the dependent instruction are reset accordingly. If the producer instruction is not canceled and scheduled for execution, the cancel timer does not affect the scheduling of the dependent instruction.

In the present exemplary embodiment, the cancel timer referred to for canceling the dependent instruction 200 is described as being set for each source of the dependent instruction 200 in the scheduler 103. However, as long as the cancel timer is set for the purpose of canceling an instruction, the cancel timer may not be set for each source of an instruction, and instead, may be set for each instruction to save resources of the scheduler 103.

Figure 3:
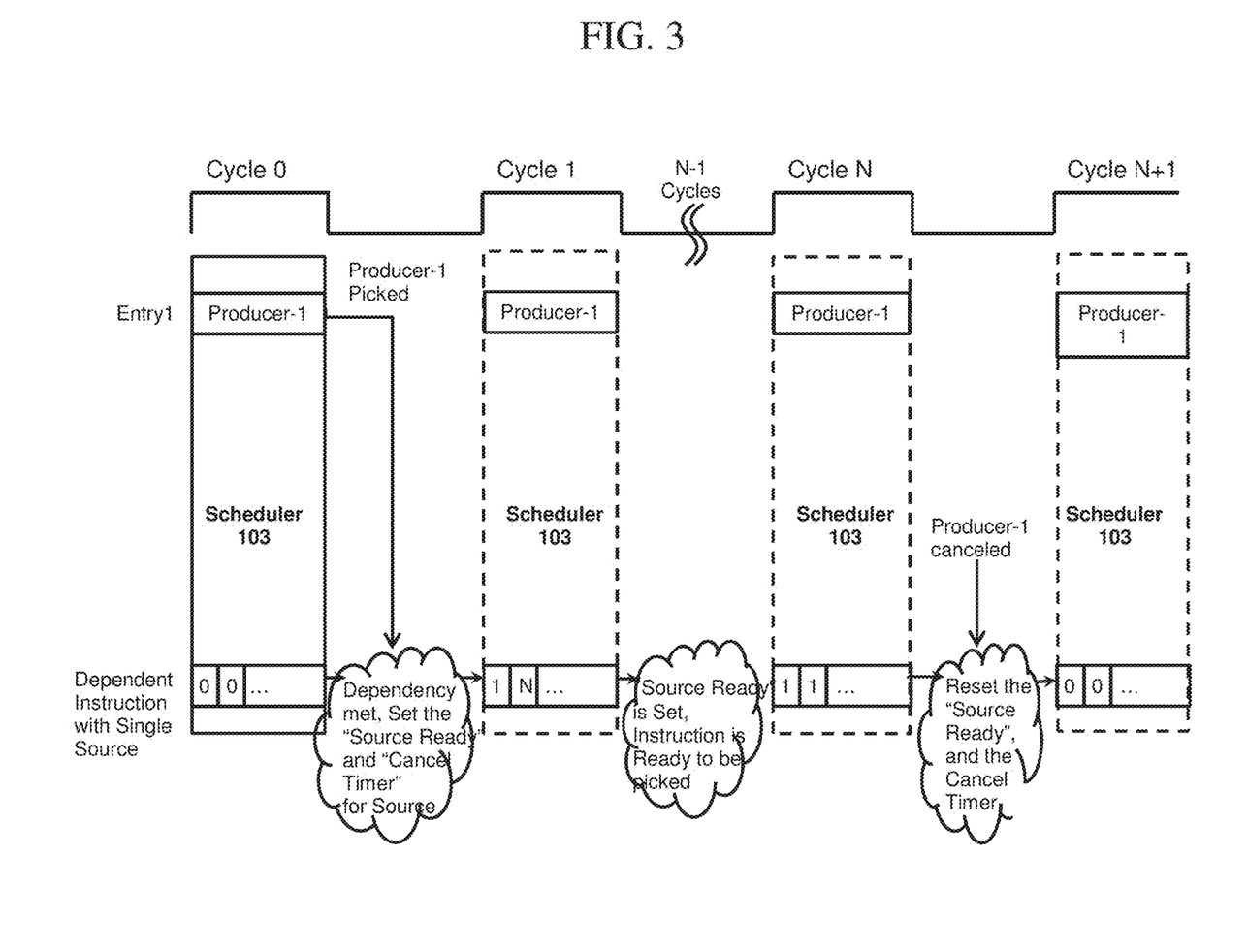
FIG. 3 illustrates a process of setting and resetting a source ready bit and a cancel timer in view of a clock cycle, according to an exemplary embodiment.

FIG. 3 illustrates a process of setting and resetting the source ready bit, according to an exemplary embodiment.

Here, a producer instruction Producer 1 and a dependent instruction are located in the scheduler 103 of the processor shown in FIG. 1. In this embodiment, it is assumed that the dependent instruction has a single source. Also, in this embodiment, a cancel timer for the source may be set based on the number of cycles it will take for a possible cancel to be asserted for the Producer-1 from the point of speculative waking up of the dependent instruction, according to an exemplary embodiment. The cancel timer is further set according to a predetermined cancel timer expiration value that enables the producer instruction Producer-1 to determine that the asserted cancel is a cancel instruction intended for itself when the cancel timer reaches the predetermined cancel timer expiration value. In other words, the cancel timer for a producer instruction expires when the cancel timer for that producer instruction reaches the predetermined cancel timer expiration value. Accordingly, if the number of cycles it will take for the possible cancel to be asserted for the Producer-1 is N−1 cycles, then the cancel timer may be set to N. For example, if the number of cycles it will take for the possible cancel to be asserted is 3 cycles (i.e., N−1 cycles), then the cancel timer may be set to 4 (i.e., N) and the predetermined cancel timer expiration value is "1". Accordingly, when the cancel timer reaches the predetermined cancel timer expiration value "1", i.e., the N−1 cycles have passed and the Producer-1 is canceled, the dependent instruction is also canceled, and then, the source ready bit for the source is reset. Using the example above, if 3 cycles have passed (i.e., N−1 cycles), and the cancel timer is initially set to 4 (i.e., N), the predetermined cancel timer expiration value of "1" is reached. When the predetermined cancel timer expiration value is reached, the producer instruction Producer-1 is able to determine that the asserted cancel is a cancel instruction intended for itself. Although the predetermined cancel timer expiration value of "1" is selected in this exemplary embodiment, other predetermined non-zero cancel timer expiration values may be selected. For example, if the number of cycles it will take for the possible cancel to be asserted is 3 cycles (i.e., N−2 cycles), then the cancel timer may be set to 5 (i.e., N). Accordingly, when the cancel timer reaches "2" after 3 cycles, reaching the predetermined cancel timer expiration value of "2", the producer instruction Producer-1 is able to determine that the asserted cancel is a cancel instruction intended for itself. Here, the value N can be any natural number.

In reference to FIG. 3, a process of setting and resetting the source ready bit and the cancel timer in the scheduler 103 in view of a clock cycle of the processor of FIG. 1 is described as below.

At cycle 0, when the Producer-1 and the dependent instruction are located in the scheduler 103, a source ready field and a cancel time field are allocated to the dependent instruction. At this time, however, if the Producer-1 has not been picked in the scheduler 103, a source ready bit and a cancel timer in the respective fields in the scheduler 103 are not set, and thus, their values remain at "0". During this cycle 0, if the Producer-1 is picked in the scheduler 103 and the Producer-1 speculatively wakes up the dependent instruction, the source ready bit is set and, at the same time or immediately before or after the source ready bit is set, the cancel timer is also set, at the end of this cycle 0.

At cycle 1, since the Producer-1 is picked and the Producer-1 speculatively wakes up the dependent instruction, the source ready bit for the source of the dependent instruction is set to "1" to indicate that the dependent instruction is ready to be picked. Also, the cancel timer is set to N for the source of the dependent instruction and the predetermined cancel timer expiration value may be "1". The cancel timer N set for the source is based on the number of cycles it will take for a possible cancel to be asserted for the Producer-1, in view of the predetermined cancel timer expiration value, as discussed above. The cancel timer starts to count down from the waking up point until it expires (when the predetermined cancel timer expiration value is reached), i.e., the N−1 cycles have passed as indicated by the cancel timer reaching the predetermined cancel timer expiration value of "1".

At cycle N, if the cancel timer expires (i.e., the predetermined cancel timer expiration value is reached) and a cancel occurs to the Producer-1, the dependent instruction is no longer ready to be picked until it is woken up again. Thus, at the end of the cycle N, the source ready bit and the cancel timer for the source of the dependent instruction is reset, e.g., set to a value "0", which indicates that the dependent instruction is no longer ready to be picked until it is woken up again.

At cycle N+1, the source ready bit and the cancel timer remains at "0" since the dependent is not woken up again.

The exemplary embodiments described herein only require a small cancel timer per source to reset the source ready bit for a source of a dependent instruction. It eliminates the need for a huge number of comparisons between destination tags of canceled instructions as well as their dependent instructions against the source tags of all instructions in the scheduler 103 to reset the source ready bit.

The inventive concept works not only for direct dependent instructions of a producer instruction but also for indirect dependent instructions which are also referred to as shadow dependent instructions as described in reference to FIG. 4 below.

Figure 4:
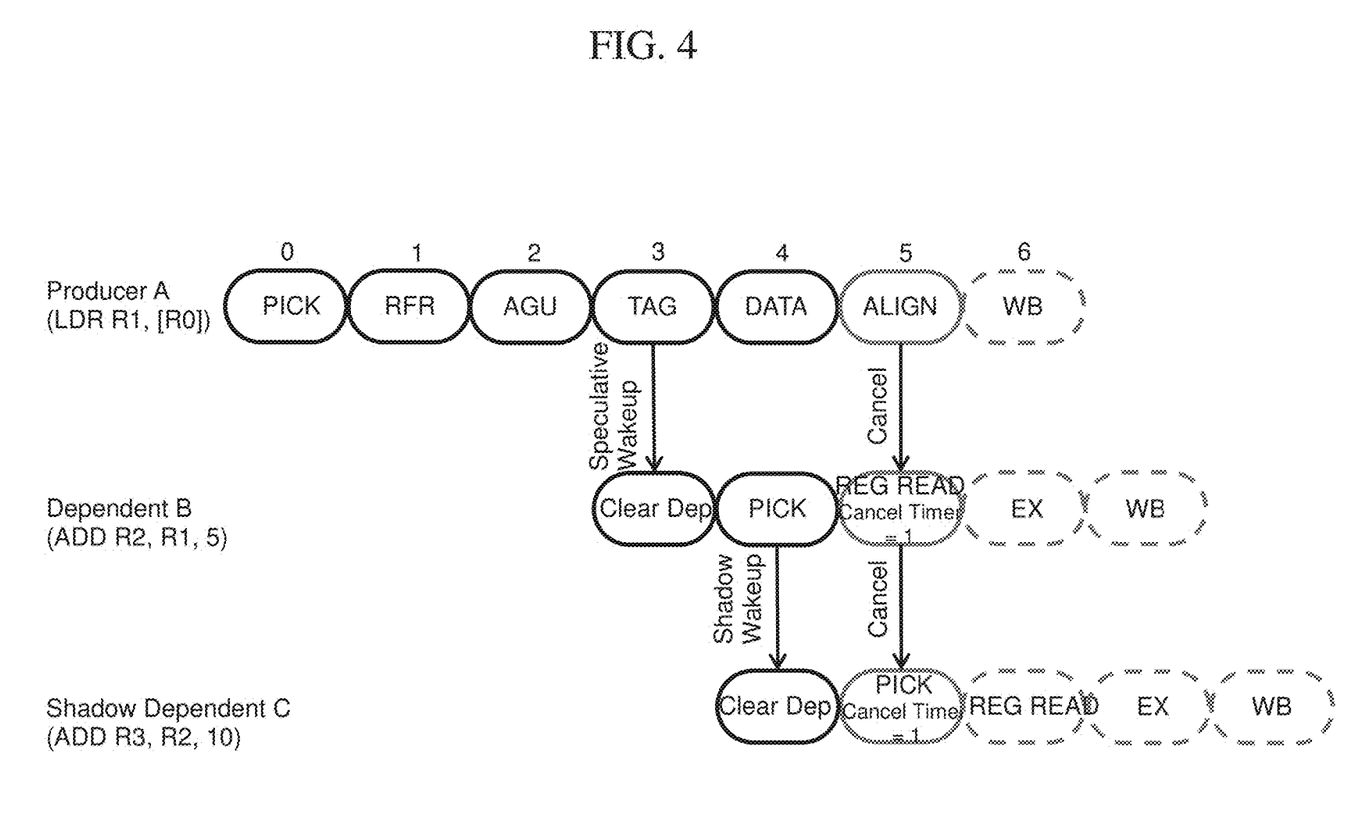
FIG. 4 illustrates a schematic diagram of an instruction pipeline, according to an exemplary embodiment.

FIG. 4 illustrates a schematic diagram of an instruction pipeline which includes a producer instruction and two dependent instructions working on respective cancel timers, according to an exemplary embodiment.

In FIG. 4, the pipeline includes a producer instruction Producer A (LDR R1, [R0]), a direct dependent instruction Dependent B (ADD R2, R1, 5) which depends on the Producer A, and an indirect dependent instruction Shadow Dependent C (ADD R3, R2, 10) which depends on the Dependent B. The indirect dependent instruction Shadow Dependent C is also referred to as a nested dependent instruction. Therefore, the Shadow Dependent C has a shadow dependency or nested dependency on the Producer A. The Dependent B and the Shadow Dependent C are depicted as single cycle latency instructions which do not directly trigger a cancel, whereas the Producer A is depicted as a multi cycle latency instruction which can be canceled in cycle #5.

Figure 5:
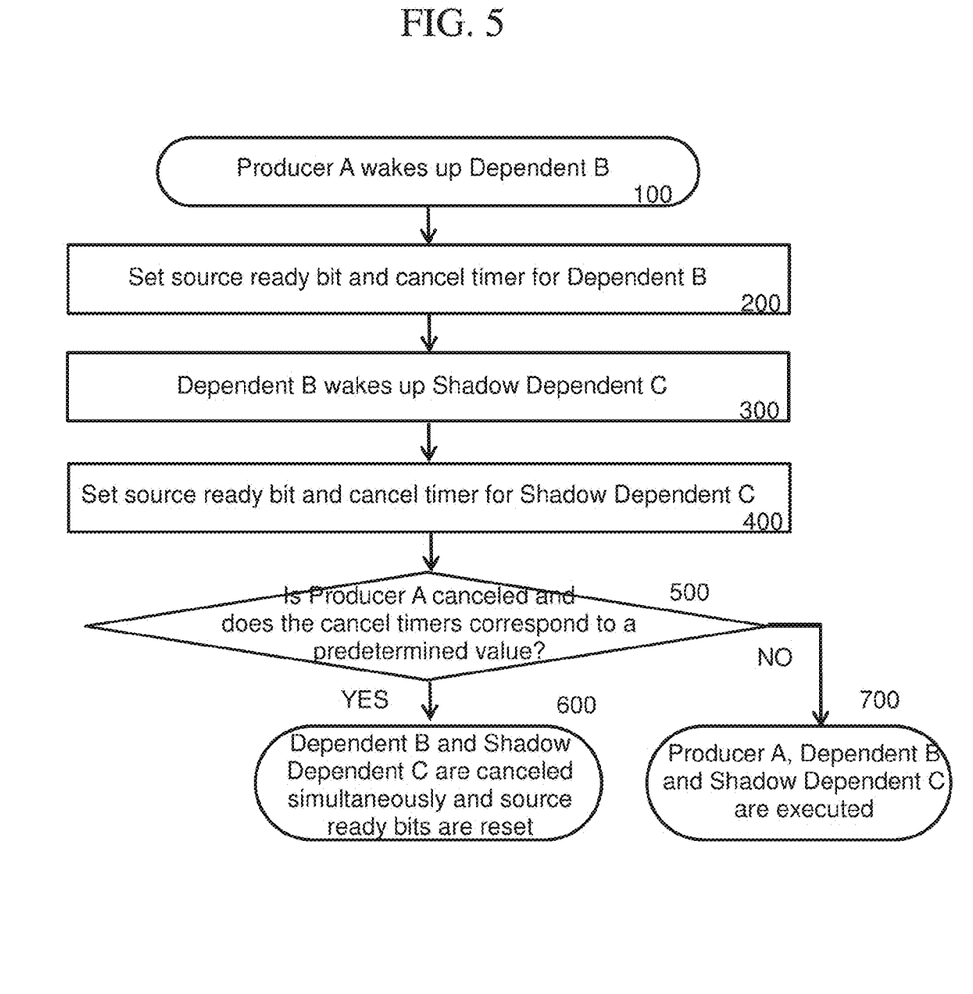
FIG. 5 illustrates a flowchart explaining instruction cancelling and source resetting operations in FIG. 5, according to an exemplary embodiment.

Hereinafter, operations of cancelling dependent instructions in the instruction pipeline shown in FIG. 4 and resetting source ready bits for the dependent instructions are described in reference to FIGS. 1-3, according to an exemplary embodiment. FIG. 5 illustrates a flowchart explaining the cancelling and resetting operations in FIG. 5, according to an exemplary embodiment.

In the present embodiment, each of the Dependent B and the Shadow Dependent C is assumed to have a single source and it is assumed that the predetermined cancel timer value is "1". As shown in FIG. 5, in cycle #3, the Producer A (LDR R1, [R0]) speculatively wakes up the Dependent B (ADD R2, R1, 5) to allow the Dependent B to grab its source data R1 from a forwarding path (S100).

Then, in the same cycle #3, a source ready bit and a cancel timer for the source are set for the Dependent B (S200). The cancel timer for the Dependent B is set based on the number of cycles it will take for a possible cancel to be asserted for the Producer A from the point of waking up the Dependent B by the Producer A. In the present embodiment, the cancel timer is set to "2" corresponding to cycle #5. Immediately after the source ready bit and the cancel timer are set for the Dependent B, the cancel timer for the source the Dependent B starts ticking down.

In turn, the Dependent B wakes up the Shadow Dependent C (ADD R3, R2, 10) in cycle #4 to grab its source data R2 from its forwarding path (S300).

Then, in the same cycle #4, a source ready bit and a cancel timer for the source are set for the Shadow Dependent C (S400). The cancel timer for the Shadow Dependent C is set based on the number of cycles it will take for a possible cancel to be asserted by the Producer A from the point of waking up the Shadow Dependent C by the Dependent B. In the present embodiment, the cancel timer is set to "1" corresponding to cycle #5. Immediately after the source ready bit and the cancel timer are set for the Shadow Dependent C, the cancel timer for the source of the Shadow Dependent C starts ticking down.

Next, in cycle #5, it is determined whether the Producer A is canceled and the cancel timers for the Dependent B and the Shadow Dependent C correspond to a predetermined cancel timer expiration value "1" corresponding to cycle #5 (S500).

If it is determined that the Producer A is canceled and the cancel timers correspond to the predetermined value corresponding to cycle #5, both the Dependent B and the Shadow Dependent C are canceled at the same time and the source ready bits and the cancel timers for the sources of the Dependent B and the Shadow Dependent C are reset (S600). However, if it is determined that the Producer A is not canceled in cycle #5, the Producer A and its dependent instructions including the Dependent B and the Shadow Dependent C are executed (S700).

The instruction cancelling and source resetting scheme according to the above exemplary embodiments applies to a plurality of dependent instructions and/or a plurality of shadow dependent instructions at the same time just by observing cancel timers for the respective dependent instructions and a cancel indicator of their base producer instruction (Producer A in the case of FIG. 4). In the above exemplary embodiments, if a cancel is asserted for a producer instruction and if cancel timers for sources of dependent instructions satisfy a predetermined cancel timer value, all the dependent instructions and nested dependent instructions are canceled and their source ready bits and cancel timers are reset substantially at the same time. This simple cancel timer based instruction cancelling and source ready bit resetting approach eliminates the need for any expensive tag comparison for an instruction tag as well as their dependent instruction tags in a related art, and thus, minimizes power consumption of an instruction process in a processor.

The above exemplary embodiments are meant to be illustrative only and are not intended to be limiting the scope of the inventive concept. For example, the exemplary value of the source ready bit and the cancel timer in the description can be set to any number. The actual bit size (or width) of the source ready bit and the cancel timer can also be any value. In addition, the number of clock cycles described in the description can be any number. Furthermore, although the disclosed exemplary embodiments are described primarily in the context of speculative instructions, the teachings of the present disclosure are not limited and may also be applied to other types of instructions. Also, although it is assumed in the above exemplary embodiments that the dependent instruction has a single source, the inventive concept can apply to a dependent instruction having two or more sources. These and other variations, modifications, additions and improvements may fall within the scope of inventive concept. Therefore, the scope of the inventive concept is defined not by the detailed descriptions of the exemplary embodiments but by the appended claims, and all differences within the scope will be construed as being included in the inventive concept.

The use of the terms "a" and "an" and "the" and similar referents in the context of describing the inventive concept (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

What is claimed is:

1. A method of processing a plurality of instructions, the method comprising:
   speculatively waking up a source of a dependent instruction by a producer instruction of the dependent instruction;
   speculatively waking up, by the dependent instruction, a source of a nested dependent instruction depending on the dependent instruction;

setting a source ready bit of the source of the dependent instruction and setting a source ready bit of the source of the nested dependent instruction to indicate that the source of the dependent instruction and the source of the nested dependent instruction are ready for access;

setting a cancel timer of the source of the dependent instruction for controlling cancellation of selectability of the dependent instruction for execution by an instruction scheduler and setting a cancel timer of the source of the nested dependent instruction for controlling cancellation of selectability of the nested dependent instruction for execution by the instruction scheduler, based on a number of cycles at which a cancel instruction is expected to be asserted for canceling the producer instruction; and simultaneously canceling the dependent instruction and the nested dependent instruction to indicate that the dependent instruction and the nested dependent instruction are unavailable to be selected for execution by the instruction scheduler if (i) the cancel timer of the source of the dependent instruction and the cancel timer of the source of the nested dependent instruction expire and (ii) the producer instruction is canceled according to a received cancel instruction corresponding to a cancel indicator of the producer instruction, wherein the cancel timer of the source of the dependent instruction and the cancel timer of the source of the nested dependent instruction expire when the cancel timer of the source of the dependent instruction and the cancel timer of the source of the nested dependent instruction reach a predetermined value.

2. The method of claim 1, wherein the predetermined value is a non-zero value.

3. The method of claim 1, further comprising:
resetting the source ready bit of the source of the dependent instruction and the source ready bit of the source of the nested dependent instruction to indicate that the dependent instruction and the nested dependent instruction are unavailable to be selected for execution by the instruction scheduler unless the dependent instruction and the nested dependent instruction are woken up again.

4. The method of claim 3, further comprising:
resetting the cancel timer of the source of the dependent instruction and the cancel timer of the source of the nested dependent instruction.

5. The method of claim 3, wherein resetting is performed after the simultaneously canceling of the dependent instruction and the nested dependent instruction.

6. The method of claim 5, wherein the nested dependent instruction is woken up by the dependent instruction a predetermined time after the dependent instruction is speculatively woken up by the producer instruction, and
wherein the cancel timer of the source of the dependent instruction and the cancel timer of the source of the nested dependent instruction are set to different values based on the number of cycles at which the cancel instruction is expected to be asserted for canceling the producer instruction.

7. The method of claim 1, wherein the nested dependent instruction is woken up by the dependent instruction a predetermined time after the dependent instruction is speculatively woken up by the producer instruction, and
wherein the cancel timer of the source of the dependent instruction and the cancel timer of the source of the nested dependent instruction are set to different values based on the number of cycles at which the cancel instruction is expected to be asserted for canceling the producer instruction.

8. The method of claim 1, wherein the producer instruction is speculatively picked.

9. The method of claim 1, wherein the setting the cancel timer of the source of the dependent instruction comprises setting the cancel timer of the source of the dependent instruction based on the number of cycles at which the cancel instruction is expected to be asserted for the producer instruction from a time of speculatively waking up the source of the dependent instruction by the producer instruction, and
wherein the setting the cancel timer of the source of the nested dependent instruction comprises setting the cancel timer of the source of the nested dependent instruction based on the number of clock cycles at which the cancel instruction is expected to be asserted for the producer instruction from a time of speculatively waking up the source of the nested dependent instruction by the producer instruction.

10. An apparatus for instruction processing, the apparatus comprising:
an instruction scheduler configured to a producer instruction for scheduling execution; and
a controller configured to:
speculatively wake up a source of a dependent instruction by a producer instruction of the dependent instruction;
speculatively wake up a source of a nested dependent instruction depending on the dependent instruction;
set a source ready bit of the source of the dependent instruction and a source ready bit of the source of the nested dependent instruction to indicate that the source of the dependent instruction and the source of the nested dependent instruction are ready for access;
set a cancel timer of the source of the dependent instruction for controlling cancellation of selectability of the dependent instruction for execution by the instruction scheduler and a cancel timer of the source of the nested dependent instruction for controlling cancellation of selectability of the nested dependent instruction for execution by the instruction scheduler, based on a number of cycles at which a cancel instruction is expected to be asserted for canceling the producer instruction; and
simultaneously cancel the dependent instruction and the nested dependent instruction to indicate that the dependent instruction and the nested dependent instruction are unavailable to be selected for execution by the instruction scheduler if (i) the cancel timer of the source of the dependent instruction and the cancel timer of the source of the nested dependent instruction expire and (ii) the producer instruction is canceled according to a received cancel instruction corresponding to a cancel indicator of the producer instruction,
wherein the cancel timer of the source of the dependent instruction and the cancel timer of the source of the nested dependent instruction expire when the cancel timer of the source of the dependent instruction and the cancel timer of the source of the nested dependent instruction reach a predetermined value.

11. The apparatus of claim 10, wherein the predetermined value is a non-zero value.

12. The apparatus of claim 10, wherein the controller is further configured to reset the source ready bit of the source of the dependent instruction and the source ready bit of the source of the nested dependent instruction to indicate that the dependent instruction and the nested dependent instruction are unavailable to be selected for execution by the instruction scheduler unless the dependent instruction and the nested dependent instruction are woken up again.

13. The apparatus of claim 12, wherein the controller is further configured to reset the cancel timer of the source of the dependent instruction and the cancel timer of the source of the nested dependent instruction.

14. The apparatus of claim 12, wherein the controller is configured to reset the source ready bit of the source of the dependent instruction and the source ready bit of the source of the nested dependent instruction after simultaneously canceling the dependent instruction and the nested dependent instruction.

15. The apparatus of claim 14, wherein the nested dependent instruction is woken up by the dependent instruction a predetermined time after the dependent instruction is speculatively woken up by the producer instruction, and wherein the controller is further configured to set the cancel timer of the source of the dependent instruction and the cancel timer of the source of the nested dependent instruction to different values based on the number of cycles at which the cancel instruction is expected to be asserted for canceling the producer instruction.

16. The apparatus of claim 10, wherein the nested dependent instruction is woken up by the dependent instruction a predetermined time after the dependent instruction is speculatively woken up by the producer instruction, and wherein the controller is further configured to set the cancel timer of the source of the dependent instruction and the cancel timer of the source of the nested dependent instruction to different values based on the number of cycles at which the cancel instruction is expected to be asserted for canceling the producer instruction.

17. The apparatus of claim 10, wherein the producer instruction is speculatively picked.

18. The apparatus of claim 10, wherein the controller is further configured to determine the cancel timer of the source of the dependent instruction comprises setting the cancel timer of the source of the dependent instruction based on the number of cycles at which the cancel instruction is expected to be asserted for the producer instruction from a time of speculatively waking up the dependent instruction by the producer instruction, and wherein the controller is further configured to determine the cancel timer of the source of the nested dependent instruction based on the number of clock cycles at which the cancel instruction is expected to be asserted for the producer instruction from a time of speculatively waking up the source of the nested dependent instruction by the producer instruction.

19. The apparatus of claim 10, wherein the source ready bit of the source of the dependent instruction, the source ready bit of the source of the nested dependent instruction, the cancel timer of the source of the dependent instruction, and the cancel timer of the source of the nested dependent instruction are set as entries of the instruction scheduler.

* * * * *